United States Patent [19]
Garbutt

[11] Patent Number: 5,879,562
[45] Date of Patent: Mar. 9, 1999

[54] WATER TREATMENT PROCESS FOR REDUCING THE HARDNESS OF AN OILFIELD PRODUCED WATER

[75] Inventor: Charles F. Garbutt, Midland, Tex.

[73] Assignee: Marathon Oil Company, Findlay, Ohio

[21] Appl. No.: 839,586

[22] Filed: Apr. 15, 1997

[51] Int. Cl.⁶ ..................... C02F 1/52
[52] U.S. Cl. ............ 210/718; 210/724; 210/726; 210/737
[58] Field of Search .......... 210/702, 714, 210/718, 723, 724, 726, 737

[56] References Cited

U.S. PATENT DOCUMENTS

| | | | |
|---|---|---|---|
| 2,401,924 | 6/1946 | Goetz | 210/714 |
| 2,999,809 | 9/1961 | Eigner et al. | 210/48 |
| 3,026,261 | 3/1962 | Mayfield et al. | 210/56 |
| 3,839,199 | 10/1974 | Weiss et al. | 210/20 |
| 4,018,656 | 4/1977 | Rogers et al. | 203/11 |
| 4,029,576 | 6/1977 | Shivers | 210/27 |
| 4,035,293 | 7/1977 | Benoit et al. | 210/45 |
| 4,036,749 | 7/1977 | Anderson | 210/23 |
| 4,336,232 | 6/1982 | Moritz | 423/164 |
| 4,366,066 | 12/1982 | Rogers et al. | 210/696 |
| 4,518,505 | 5/1985 | Lim et al. | 210/712 |
| 4,663,054 | 5/1987 | O'Connell et al. | 210/713 |
| 4,724,085 | 2/1988 | Pohoreski | 210/713 |
| 4,877,536 | 10/1989 | Bertness et al. | 210/712 |
| 5,075,007 | 12/1991 | Morper et al. | 210/604 |
| 5,609,765 | 3/1997 | Bowman | 210/638 |

*Primary Examiner*—Peter A. Hruskoci
*Attorney, Agent, or Firm*—Jack L. Hummel; Jack E. Ebel

[57] ABSTRACT

A multi-stage process is provided for treating a water to reduce its hardness. The feed water is initially heated to a thermal reaction temperature in a heating stage. The heated water is then maintained at or near the thermal reaction temperature for a sufficient residence time to thermally react the water, producing a first portion of a scale from the scale-forming ions in the water while discharging dissolved gases from the water. After the thermal reaction stage, one or more chemical additives in the form of a hydroxide ion donor and optionally a bicarbonate ion donor are added to the heated water in a chemical reaction stage. The chemical additive is chemically reacted with the water in the chemical reaction stage, producing a second portion of the scale from the scale-forming ions in the water. A treated water having a reduced hardness is recovered from a sludge settling stage and the scale produced by the thermal and chemical reaction stages is discharged from the water and accumulated in a sludge accumulation stage for withdrawal from the process.

6 Claims, 4 Drawing Sheets

WATER TREATMENT PROCESS FOR REDUCING THE HARDNESS OF AN OILFIELD PRODUCED WATER

TECHNICAL FIELD

The present invention relates generally to water treatment, and more particularly to a process for reducing the hardness of an oilfield produced water or other hard water.

BACKGROUND OF THE INVENTION

One conventional method for softening hard water used in industrial applications is lime softening, wherein a suitable chemical additive, such as lime or soda ash, is introduced to the hard water. The chemical additive induces the formation of insoluble precipitates, such as calcium carbonate or magnesium hydroxide, that are readily discharged from the water to obtain a soft water product. Another conventional method for softening hard water is thermal softening, wherein the hard water is heated to a relatively high temperature, thermally inducing the formation of the insoluble precipitates. Lime softening and thermal softening have also been combined in a single process termed a hot lime treatment process, wherein the lime is added to the feed water and the feed water is heated thereafter to form insoluble precipitates and obtain a soft water product. The hot lime treatment process is disclosed in U.S. Pat. Nos. 4,029,576; 4,518,505; and 4,366,066.

The hot lime treatment process achieves a relatively high quality soft water product, but has correspondingly high energy and chemical requirements. Consequently the operating costs for the process are excessive. As such, the present invention recognizes a need for a more cost effective process of treating water to reduce its hardness. Accordingly, it is an object of the present invention to provide an effective process for treating a hard water to reduce the hardness thereof. More particularly, it is an object of the present invention to provide an effective process for reducing the hardness of an oilfield produced water. It is another object of the present invention to provide a process for reducing the hardness of an oilfield produced water that has relatively low chemical requirements. It is still another object of the present invention to provide a process for reducing the hardness of an oilfield produced water that has relatively low energy requirements. It is yet another object of the present invention to provide a process for reducing the hardness of an oilfield produced water that reduces the amount of sludge that is produced as waste. It is a further object of the present invention to provide a process for reducing the hardness of an oilfield produced water that also effectively removes dissolved gases from the water. These objects and others are achieved in accordance with the invention described hereafter.

SUMMARY OF THE INVENTION

The present invention provides a process for treating a water to reduce its hardness. The process is generally applicable to the treatment of water that contains scale-forming ions, such as bicarbonate or sulfate anions and alkaline earth metal cations, particularly calcium, magnesium or barium cations. The water treatment process is performed in sequential stages including a heating stage, a thermal reaction stage, a chemical reaction stage, a sludge settling stage and a sludge accumulation stage. The feed water is initially heated to a thermal reaction temperature in the heating stage. The heated water is then maintained at or near the thermal reaction temperature for a sufficient residence time to react the water, producing a first portion of a scale from the scale-forming ions in the water. Dissolved gases included in the water, such as carbon dioxide or hydrogen sulfide, are also discharged from the water during the heating or thermal reaction stage.

After the thermal reaction stage, a first chemical additive in the form of a hydroxide ion donor, such as lime, caustic or a mixture thereof, is added to the heated water in the chemical reaction stage. A second chemical additive in the form of a bicarbonate ion donor, such as soda ash, may also optionally be added to the heated water in the chemical reaction stage. The one or more chemical additives are reacted with the water in the chemical reaction stage, producing a second portion of the scale from the scale-forming ions in the water. A treated water having a reduced hardness is recovered from the sludge settling stage and the scale produced by the thermal and chemical reaction stages is precipitated from the water in the sludge settling stage and accumulated in the sludge accumulation stage for discharge from the process. The scale typically includes alkaline earth metal salts of carbonate or sulfate, alkaline earth metal silicates, magnesium hydroxide or mixtures thereof.

A treatment vessel used in the practice of the present water treatment process is provided having a heating zone at the top of the treatment vessel which includes a water inlet and a steam inlet. The water inlet is one or more nozzles directing a feed water in a substantially downward direction while the steam inlet directs a hot steam in a direction substantially normal to the downward direction of the water. A thermal reaction zone is positioned beneath the heating zone having a sidewall downwardly tapered to a narrow orifice. A chemical reaction zone having at least one chemical additive inlet is positioned proximal to the orifice. The chemical reaction zone is preferably a tubular conduit extending below the thermal reaction zone, wherein the orifice is the open upper end of the tubular conduit. The downwardly tapered sidewall partitions the thermal reaction zone from the chemical reaction zone, with fluid communication therebetween being restricted to the narrow orifice. A sludge settling zone is provided having a lower portion containing a deflector plate positioned beneath the chemical reaction zone. The sludge settling zone also has an upper portion containing a treated water outlet positioned at a height even with or above the chemical reaction zone. A sludge accumulation zone is positioned beneath the sludge settling zone having a sidewall downwardly tapered to a sludge outlet at the bottom of the treatment vessel.

The invention will be further understood from the accompanying drawings and description.

DESCRIPTION OF PREFERRED EMBODIMENTS

The present invention is a process for treating a water to reduce its hardness by removing scale-forming cations from the water. The process is generally applicable to the treatment of substantially any feed water containing scale-forming cations that are correlated to hardness. Scale-forming cations are defined herein as positively charged ionic species capable of producing relatively water-insoluble scale when bonded or otherwise associated with a corresponding negatively charged anion. The scale-forming cations are typically divalent metal cations, particularly alkaline earth metal cations, and more particularly calcium, magnesium or barium cations. The anions that conventionally associate with the above-recited cations to form scale are carbonates, sulfates, silicates or hydroxide anions.

Although the present water treatment process is not limited to any specific feed water, the process has been found to be effective for the treatment of an oilfield produced water, defined herein as connate water or injected water residing in a subterranean formation of an oilfield that is produced from the formation in association with the production of hydrocarbons from the oilfield. An oilfield produced water, for which the present water treatment process is particularly effective, exhibits a significant concentration of scale-forming cations, such as calcium, magnesium or barium cations. The oilfield produced water typically has a hardness in a range between about 100 and about 2,000 ppm, and preferably between about 100 and about 200 ppm, wherein hardness is expressed in terms of $CaCO_3$ concentration determined by converting the actual measured concentration of calcium and magnesium cations in the water to an equivalent calculated $CaCO_3$ concentration in a manner well known to the skilled artisan.

In addition to scale-forming cations, the oilfield produced water may exhibit a significant concentration of corresponding anions, such as bicarbonate, sulfate or silicate anions. The oilfield produced water may further include significant concentrations of other ancillary constituents, such as dissolved gases, silica, other dissolved solids, or oil, some or all of which may be reduced in concentration as an adjunct to the practice of the present water treatment process. In general, the oilfield produced water has a pH in a range between about 5 and about 9, and preferably between about 6 and 8, although the present invention is not limited to a specific pH range.

Figure 1:
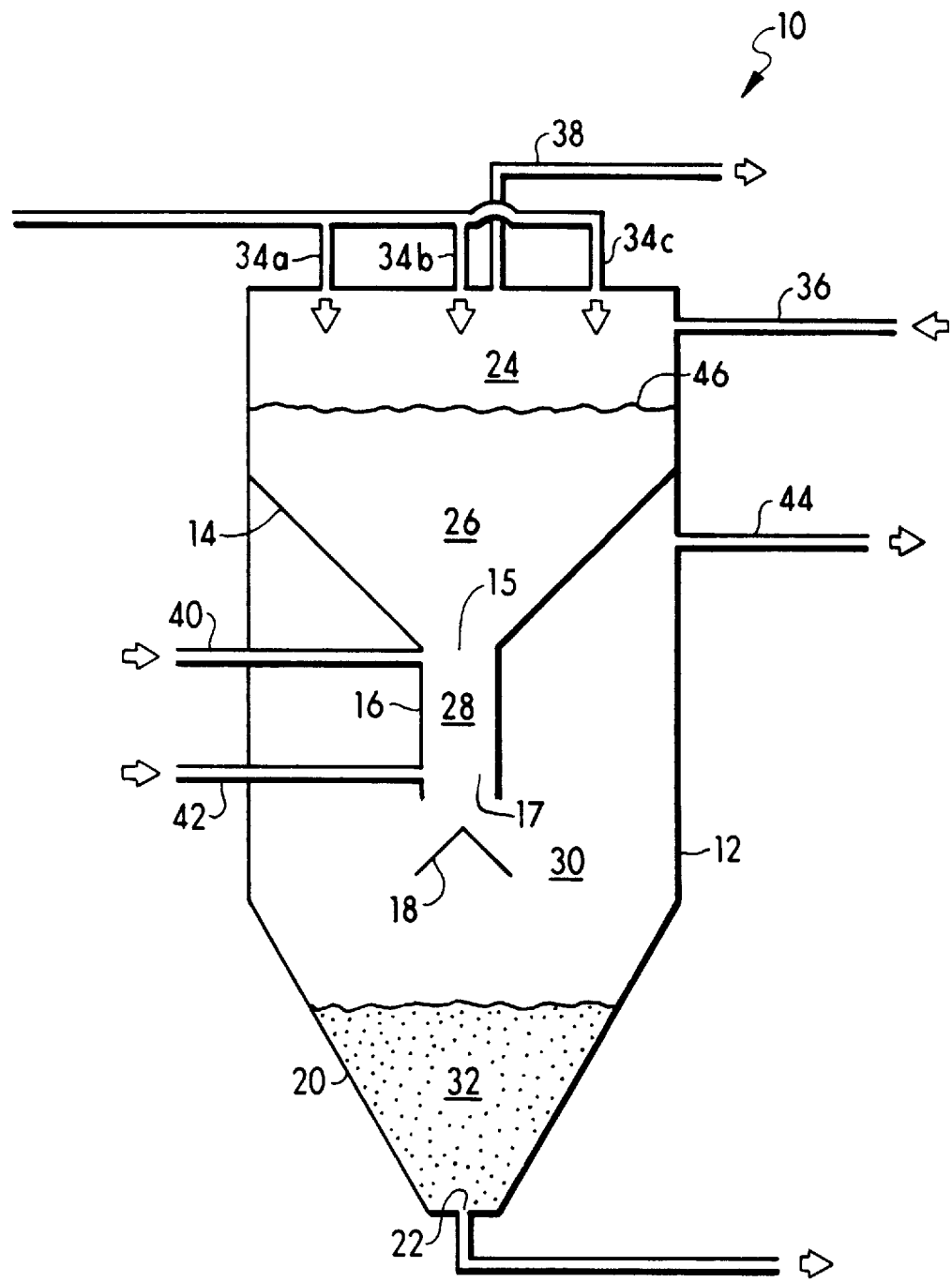
FIG. 1 is a conceptual view of a water treatment vessel used in accordance with the process of the present invention.

Referring to FIG. 1, a water treatment system used to practice the present water treatment process is shown and generally designated 10. The water treatment system 10 includes a treatment vessel 12 which is a substantially cylindrical pressurizable enclosure having an elongate upright configuration and a longitudinal axis aligned with the direction of gravitational force. The walls of the treatment vessel 12 are preferably thermally insulated and formed from a corrosion-resistant material such as stainless steel. The interior of the treatment vessel 12 defines a continuous flowpath. A funnel-shaped intermediate partition 14 is intermediately positioned within the flowpath. The intermediate partition 14 tapers downward to a first intermediate orifice 15 that forms an open upper end of a tubular intermediate conduit 16 extending downward from the intermediate partition 14. A second intermediate orifice 17 forms an open lower end of the intermediate conduit 16 and a convex deflector plate 18 is positioned beneath the second intermediate orifice 17. The lower wall 20 of the treatment vessel is likewise funnel-shaped, tapering downward to a bottom orifice 22 that functions as a sludge outlet for the treatment vessel 12.

The flowpath within the interior of the treatment vessel 12 encompasses a plurality of treatment zones including a heating zone 24, a thermal reaction zone 26, a chemical reaction zone 28, a sludge settling zone 30 and a sludge accumulation zone 32. The heating zone 24 is positioned in the uppermost portion of the treatment vessel 12 and is provided with a plurality of feed water inlets 34a, 34b, 34c, a steam inlet 36 and a gas outlet 38. The thermal reaction zone 26 is positioned beneath the heating zone 24 and is bounded by the intermediate partition 14. The chemical reaction zone 28 is positioned within the tubular intermediate conduit 16 and is provided with a first chemical additive inlet 40 and a second chemical additive inlet 42. The sludge settling zone 30 extends from the second intermediate orifice 17. The sludge settling zone 30 has a lower portion encompassing the deflector plate 18 and an upper portion extending upward behind the intermediate partition 14. The upper portion of the sludge settling zone 30 is provided with a treated water outlet 44 intermediately positioned within the treatment vessel 12 behind the intermediate partition 14 at a substantial height above the level of the second intermediate orifice 17. The sludge accumulation zone 32 is positioned in the lowermost portion of the treatment vessel 12 and is provided with a sludge outlet 22 as described above.

In operation a feed water, such as described above, is fed at ambient temperature or at a slightly elevated preheat temperature to the heating zone 24 of the treatment vessel 12 via the plurality of feed water inlets 34a, 34b, 34c. It is within the purview of the skilled artisan to design the treatment vessel 12 for substantially any water feed rate. A high temperature steam is simultaneously fed to the heating zone via the steam inlet 36 in a direction substantially normal to the direction of the flowpath. The steam enters the heating zone in a temperature range between about 100° and about 170° C. and preferably between about 148° and about 160° C. and at a feed rate correlated to the water feed rate. The feed water inlets 34a, 34b, 34c are nozzles that disperse the feed water as a fine spray radially and downward through the heating zone 36 to facilitate heat transfer between the feed water and steam. Upon contact with the steam, the feed water is instantly heated to a thermal reaction temperature in a range between about 80° and about 140° C. and preferably between about 90° and about 110° C., which is sufficient to induce scale-forming thermal reactions in the feed water. The resulting pressure within the heating zone 36 is generally in a range between about 0 and about 35 kPa and preferably between about 20 and about 28 kPa.

The heated feed water spray descends under the force of gravity into the thermal reaction zone 26 where the descent of the water is impeded by the intermediate partition 14 and intermediate conduit 16 including the first and second intermediate orifices 15, 17, causing the water to coalesce into a continuous liquid phase body having a liquid level 46. The liquid level 46 defines an interface between the heating and thermal reaction zones 24, 26, with the heating zone 24 containing essentially a vapor phase made up of the steam and spray and the thermal reaction zone 26 containing a liquid phase made up of the coalesced water. The intermediate partition 14 and intermediate conduit 16 sufficiently impede the flow of water through the thermal reaction zone 26 to provide the water with an extended residence time within the thermal reaction zone 26. The slope of the intermediate partition 14 and the cross-section of the intermediate conduit 16 are selected as a function of the thermal reaction rates such that the thermal scale-forming reactions preferably approach completion, or are at least fully developed, before the water exits the thermal reaction zone 26. As such, the residence time in the thermal reaction zone 26 is typically in a range between about 10 and about 20 minutes and preferably between about 8 and about 12 minutes. Although it is preferable not to introduce additional heat into the water in the thermal reaction zone 26, thereby minimizing the energy, consumption of the process, the water in the thermal reaction zone 26 is nevertheless maintained at or substantially near the thermal reaction temperature achieved in the heating zone 24, i.e., within about 2° C. of the thermal reaction temperature, due to the insulative properties of the treatment vessel 12.

If dissolved gases or oil are present in the feed water, these constituents are typically separated from the heated feed water in the heating zone 24 and thermal reaction zone 26 as an adjunct to the, present water treatment process. $H_2S$ and/or $CO_2$ are particular dissolved gases commonly found in oilfield produced water. As the temperature of the feed water increases, the solubility of a dissolved gas in the feed water decreases, driving the gas out of solution. The gas exiting the heated feed water migrates to the top of the heating zone 24 where it is vented from the treatment vessel 12 via the gas outlet 38. It is noted in the present water treatment process that no chemically-reactive additives are injected into the feed water in the heating and thermal reaction zones 24, 26 which would elevate the pH of the water. Since the solubility of $H_2S$ in water decreases with decreasing pH, the present process favors the removal of $H_2S$ from the feed water in the heating and thermal reaction zones 24, 26. The elevated heat of the thermal reaction zone 26 also causes any oil suspended in the feed water to separate by gravity from the feed water. Although not shown, an oil outlet may be provided in the treatment vessel 12 to withdraw oil floating atop the water from the treatment vessel 12, as is within the purview of the skilled artisan.

The thermally treated water, having thermal reaction products including scale entrained therein, exits the thermal reaction zone 26 via the first intermediate orifice 15 and flows downward through the length of the intermediate conduit 16 which constitutes the chemical reaction zone 28. A first chemical additive is injected into the chemical reaction zone 28 via the first chemical additive inlet 40 and contacts the thermally treated water descending under the force of gravity past the first chemical additive inlet 40. An optional second chemical additive is similarly injected into the chemical reaction zone 28 via the second chemical additive inlet 42 positioned downstream of the first chemical additive inlet 40. The second chemical additive contacts the thermally treated water as it continues its descent through the chemical reaction zone 28 past the second chemical additive inlet 42. The flowing condition of the water and the relatively small cross-section of the intermediate conduit 16 facilitate mixing and chemical reaction between the thermally treated water, the first chemical additive, and optional second chemical additive.

The first chemical additive is characterized as a hydroxide anion donor conventionally employed for water softening applications. Such a hydroxide anion donor is within the purview of the skilled artisan and is preferably selected as lime, caustic or a mixture thereof. The second chemical additive is characterized as a bicarbonate anion donor conventionally employed for water softening applications. Such a bicarbonate anion donor is within the purview of the skilled artisan and is preferably selected as soda ash. It is noted that the second chemical additive is optional to the extent the feed water may already have an innate concentration of a bicarbonate ion donor rendering sufficient bicarbonate anions available in the feed water to enable the chemical scale-forming reactions to proceed substantially to completion in the absence of the second chemical additive.

In any case, the selected chemical additive or additives are preferably fed to the chemical reaction zone 28 in a near stoichiometric amount relative to the amount of scale-forming constituents remaining in the thermally treated water such that sufficient hydroxide and bicarbonate anions are available to enable the chemical scale-forming reactions to proceed substantially to completion.

Although the present embodiment of the water treatment process described herein employs separate chemical additive inlets for each chemical additive injected into the chemical reaction zone 28, it is apparent to the skilled artisan that multiple chemical additives can be injected into the chemical reaction zone 28 via a common chemical additive inlet within the scope of the present invention. Where multiple chemical additives are sequentially injected into the chemical reaction zone 28 via separate chemical additive inlets as shown herein, the order and location of injection into the chemical reaction zone 28 can be modified as desired within the scope of the present invention.

Contacting the water with the first chemical additive and optional second chemical additive in the chemical reaction zone 28 produces a chemical reaction mixture comprising the water and chemical additives that react to completion substantially instantaneously upon contact. The chemical reaction mixture is discharged from the second intermediate orifice 17 and flows into the sludge settling zone 30. The deflector plate 18, which is positioned immediately beneath the second intermediate orifice 17, prevents downward channeling of the chemical reaction mixture directly into the sludge accumulation zone 32 by redirecting the chemical reaction mixture radially outward within the sludge settling zone 30. Placement of the treated water outlet 44 a substantial height above the level of the second intermediate orifice 17 causes an additional redirection of the chemical reaction mixture upward into the portion of the sludge settling zone 30 positioned behind the intermediate partition 14, filling substantially the entirety of the sludge settling zone 30 with the chemical reaction mixture.

The upward flow of the chemical reaction mixture extends the residence time of the chemical reaction mixture within the sludge settling zone 30 such that substantially all or most of the scale produced by the thermal and chemical scale-forming reactions separates from the water and descends into the sludge accumulation zone 32 under the force of gravity. The residence time in the sludge settling zone 30 is typically in a range between about 30 and about 120 minutes and preferably between about 45 and about 60 minutes. As a consequence, a treated water is produced at the treated water outlet 44 that is substantially free of scale-forming cations, which are converted to scale and separated from the water as recited above. It is noted that other ancillary dissolved solids present in the feed water may also be precipitated from the water in the manner of the scale within the sludge settling zone 30 and likewise descend into the sludge accumulation zone 32.

The treated water is withdrawn from the treatment vessel 12 via the treatment water outlet 44. The treated water has a substantially reduced hardness relative to the feed water in a range between about 2 and about 50 ppm and preferably between about 2 and about 25 ppm. Although not shown, the treated water may be filtered downstream of the treated water outlet 44 to remove any residual solids including scale entrained in the treated water.

The scale accumulates with any other solids separated from the water as sludge in the sludge accumulation zone 32. The tapered lower wall 20 of the treatment vessel 12 facilitates accumulation of the sludge. The sludge is withdrawn from the treatment vessel 12 via the sludge outlet 22. Thereafter, the sludge may be conveyed to a thickener (not shown) for further processing and disposal or other alternate uses as desired.

The present invention is not limited to a specific mechanism of operation. Nevertheless, it is believed that the reduction of water hardness is achieved in accordance with the process of the present invention by dividing the scale-forming reactions into two separate stages. The first stage is a series of thermal reactions occurring in the thermal reaction zone 26. The second stage is a series of chemical reactions occurring in the chemical reaction zone 28.

The thermal reactions are thermally induced by heating the feed water and include the following reactions:

$Ca(HCO_3)_2 \rightarrow Ca^{2+} + CO_3^{2-} + CO_2\uparrow + H_2O$ $Ca^{2+} + CO_3^{2-} \rightarrow CaCO_3\downarrow$ $CO_3^{2-} + H_2O \rightarrow 2OH^- + CO_2\uparrow$ $Mg(HCO_3)_2 \rightarrow Mg^{2+} + CO_3^{2-} + CO_2\uparrow + H_2O$ $Mg^{2+} + 2OH^- \rightarrow 2Mg(OH)_2\downarrow$ $Mg^{2+} + CO_3^{2-} + H_2O \rightarrow Mg(OH)_2\downarrow + CO_2\uparrow$ $Ca^{2+} + SO_4^{2-} \rightarrow CaSO_4\downarrow$ $Ba^{2+} + SO_4^{2-} \rightarrow BaSO_4\downarrow$ $2Mg^{2+} + 3HSiO_3^- + OH^- \rightarrow 2H_2O + Mg_2Si_3O_8\downarrow$ A principle feature of the thermal reactions is the conversion of soluble calcium bicarbonate to carbonate anions. A portion of the carbonate anions combine with calcium cations to precipitate as insoluble calcium carbonate. Another portion of the carbonate anions dissociate, providing hydroxide anions that combine with magnesium cations to precipitate as insoluble magnesium hydroxide.

The chemical reactions are initiated after completion of the thermal reactions and are chemically induced by the introduction of a hydroxide anion donor, preferably in the form of lime, caustic or a mixture thereof, and optionally a carbonate anion donor, preferably in the form of soda ash, to the reaction mixture. The chemical reactions include the following reactions:

$Ca(HCO_3)_2 + Ca(OH)_2 \rightarrow 2CaCO_3\downarrow + 2H_2O$ $Mg(HCO_3)_2 + Ca(OH)_2 \rightarrow MgCO_3\downarrow + CaCO_3\downarrow + 2H_2O$ $MgCO_3 + Ca(OH)_2 \rightarrow Mg(OH)_2\downarrow + CaCO_3\downarrow$ $MgSO_4 + Ca(OH)_2 \rightarrow Mg(OH)_2\downarrow + CaSO_4$ $MgCl_2 + Ca(OH)_2 \rightarrow Mg(OH)_2\downarrow + CaCl_2$ $Mg(NO_3)_2 + Ca(OH)_2 \rightarrow Mg(OH)_2\downarrow + Ca(NO_3)_2$ $CaCl_2 + Na_2CO_3 \rightarrow CaCO_3\downarrow + 2NaCl$ $CaSO_4 + Na_2CO_3 \rightarrow CaCO_3\downarrow + 2Na_2SO_4$ $Ca(NO_3)_2 + Na_2CO_3 \rightarrow CaCO_3\downarrow + 2NaNO_3$ The chemical reactions convert the remaining soluble calcium or magnesium compounds dissolved in the feed water not converted by the thermal reactions to insoluble precipitates of calcium or magnesium.

By performing thermal and chemical scale-forming reactions in two stages, substantial savings in chemical costs are realized. Because a significant amount of the hardness in the water is reduced during the thermal stage prior to the introduction of chemicals, the amount of chemicals needed to reduce the remaining hardness in the water during the chemical reaction stage is diminished, thereby reducing the chemical requirements of the process. The chemical requirements of the process are further conserved because $CO_2$ generated in the thermal reaction stage avoids contact with the lime added to the process in the chemical reaction stage. Substantially all of the $CO_2$ is driven into the vapor phase of the heating zone 24 due to the relatively high temperature in the liquid phase of the thermal reaction zone 26. Accordingly, little or no $CO_2$ is present in the reaction mixture when the lime is introduced thereto, preventing undesirable consumption of the lime by the $CO_2$ and preserving the lime for desired chemical scale-forming reactions with the calcium and magnesium compounds.

As noted above, the present water treatment process is also effective for the removal of dissolved gases such as $H_2S$ because the thermal reaction stage is performed at a relatively low pH due to the absence of chemical additives. Accordingly, removal of such gases, which are difficult to remove by steam deaeration at higher pH, is facilitated.

The following examples demonstrate the practice and utility of the present invention, but are not to be construed as limiting the scope of the invention.

EXAMPLE 1

An oilfield produced water is provided having the properties and composition set forth in Table 1 below:

TABLE 1

| | |
|---|---|
| Temperature | 20° C. |
| pH | 6.8 |
| TDS | 8763.0 mg/l |
| $Na^+$ | 2326.0 mg/l |
| $Mg^{2+}$ | 197.0 mg/l |
| $Ca^{2+}$ | 396.0 mg/l |
| $Sr^{2+}$ | 9.7 mg/l |
| $Fe^{2+}$ | 0.52 mg/l |
| $Cl^-$ | 3338.0 mg/l |
| $HCO_3^-$ | 2074.0 mg/l |
| $SO_4^-$ | 432.0 mg/l |
| $O_2(aq)$ | 0.25 mg/l |
| $CO_2(aq)$ | 625 mg/l |
| $H_2S(aq)$ | 200 mg/l |
| hardness (as $CaCO_3$) | 2000 ppm |

Two 500 ml samples are drawn from the oilfield produced water. The first sample is treated in accordance with a conventional hot lime water treatment process, wherein 1.6 grams of hydrated lime are initially added to the sample at ambient temperature. The sample containing hydrated lime is then heated to boiling and maintained at the boiling temperature for 5 minutes. The hardness of the resulting treated water is determined to be 25 ppm.

The second sample is treated in accordance with the multi-stage water treatment process of the present invention, wherein the sample is initially heated to boiling and maintained at the boiling temperature for 10 minutes, enabling the thermal reactions in the sample to proceed to completion. Thereafter, 0.8 grams of hydrated lime are introduced to the hot sample and reacted to completion therein. The hardness of the resulting treated water is determined to be 25 ppm. The results indicate that the same degree of hardness reduction can be achieved with significantly less lime using the water treatment process of the present invention as compared to the prior art hot lime water treatment process.

EXAMPLE 2

Figure 2:
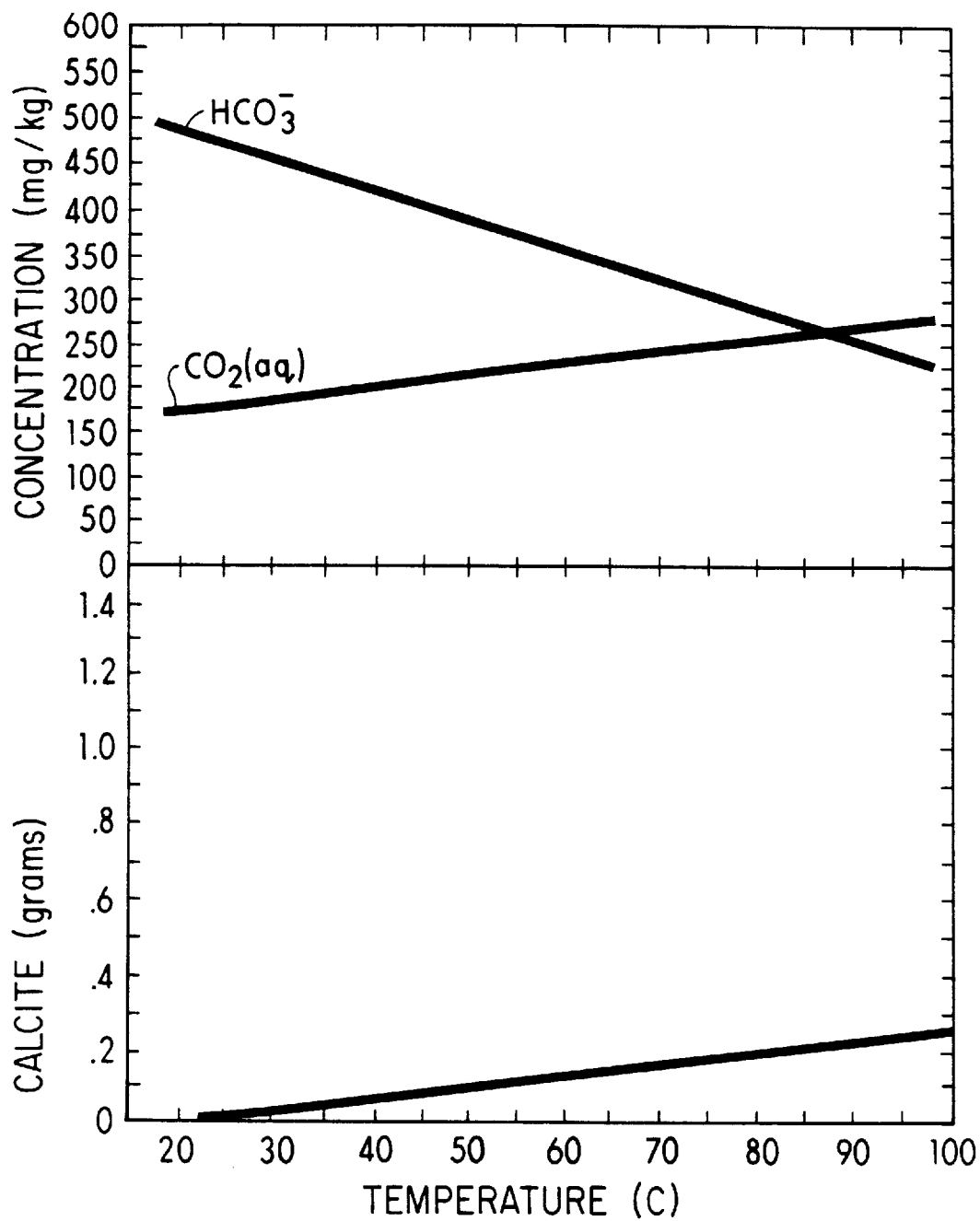
FIG. 2 is a graph showing the concentrations of $HCO_3^-$, aqueous $CO_2$ and calcite in the water as a function of temperature for the heating stage of the water treatment process of the present invention.

Two 1 liter samples of the oilfield produced water of Example 1 are heated from 20° C. to 98.89° C. FIG. 2 shows the change in concentration of free bicarbonate anions ($HCO_3^-$) and aqueous $CO_2$ in each of the samples as the samples are heated from 20° C. to 98.89° C. The concentration of $HCO_3^-$ drops with temperature while the concentration of aqueous $CO_2$ increases with temperature. The precipitation of calcite ($CaCO_3$) is also induced with increasing temperature. It is noted that the initial concentrations of $HCO_3^-$ and aqueous $CO_2$ reported in FIG. 2 differ from those reported in Table 1 above because species such as $HCO_3^-$ are partitioned between free $HCO_3^-$ and other species, such as $CO_3^{2-}$, $CaHCO_3^+$, etc., that occur in the water.

Figure 3:
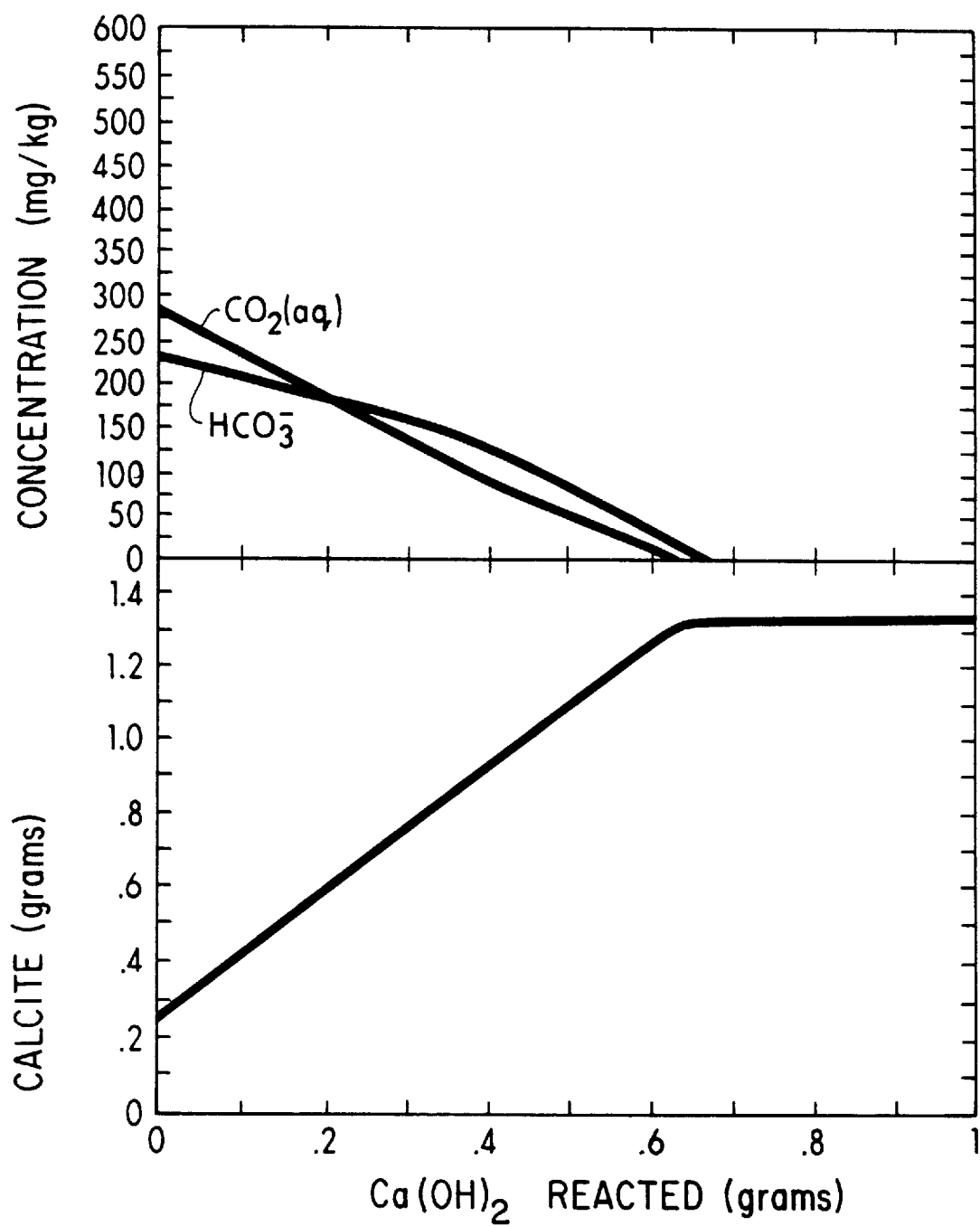
FIG. 3 is a graph showing the concentrations of $HCO_3^-$, aqueous $CO_2$ and calcite in the water as a function of lime consumption for the reaction stage of a prior art water treatment process.

One gram of lime in the form of calcium hydroxide $(Ca(OH)_2)$ is added to the first heated sample immediately upon reaching 98.89° C. in the manner of a prior art hot lime water treatment process. The $Ca(OH)_2$ reacts with the heated water, causing both the $HCO_3^-$ and aqueous $CO_2$ concentrations to drop while causing calcite precipitation to accelerate as shown in FIG. 3. Approximately 0.62 grams of $Ca(OH)_2$ are required to remove the $HCO_3^-$ and aqueous $CO_2$ from the first sample while about 1.33 grams of calcite are simultaneously produced. The removal of $HCO_3^-$ and aqueous $CO_2$ is achieved by consuming $HCO_3^-$ through the formation of calcite. This alters the $HCO_3^-$/aqueous $CO_2$ equilibrium, causing aqueous $CO_2$ to revert back to $HCO_3^-$ which participates in additional calcite formation.

Figure 4:
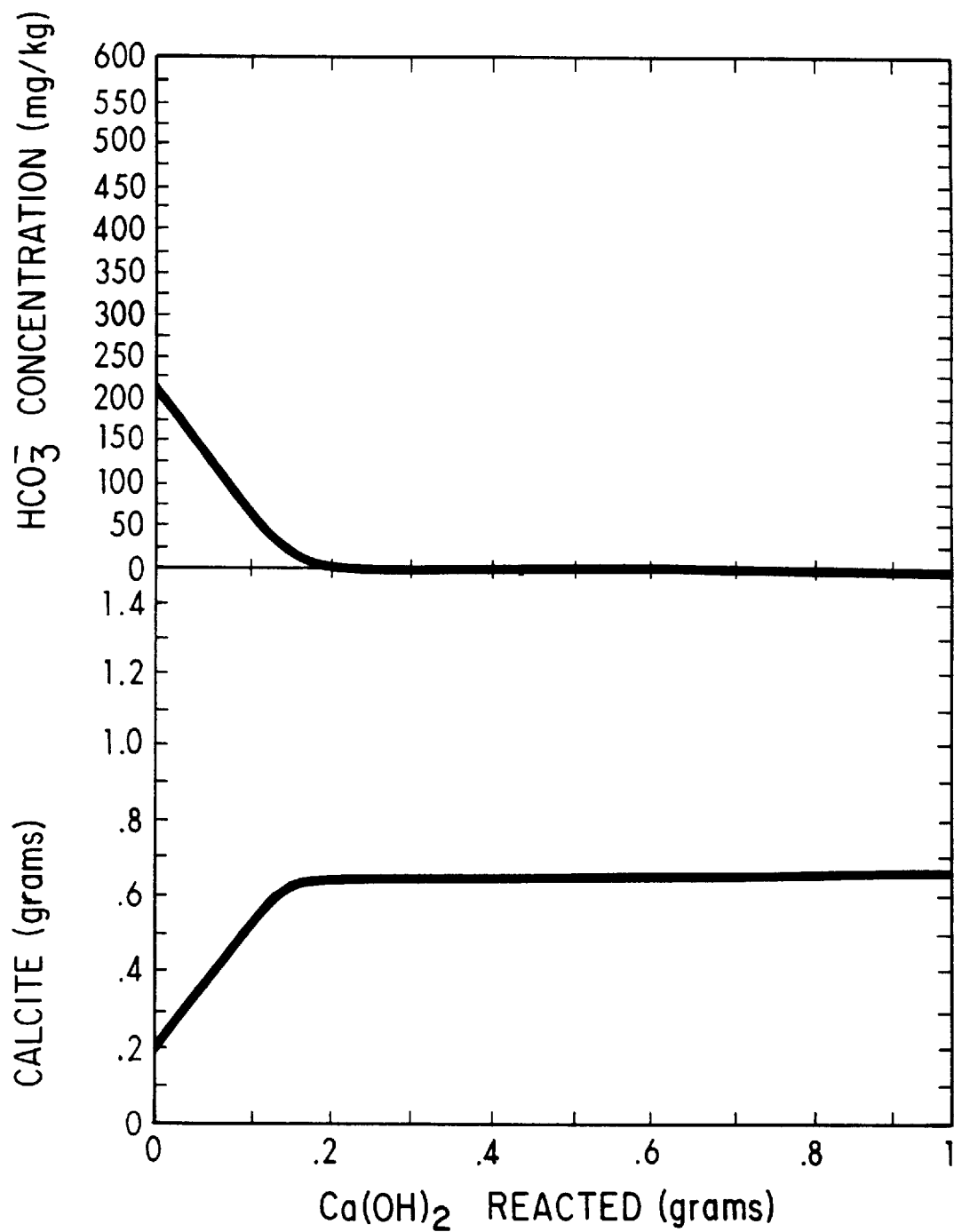
FIG. 4 is a graph showing the concentrations of $HCO_3^-$, aqueous $CO_2$ and calcite in the water as a function of lime consumption for the chemical reaction stage of the water treatment process of the present invention.

$Ca(OH)_2$ is also added to the second heated sample, but addition of the $Ca(OH)_2$ is delayed until the aqueous $CO_2$ is allowed to escape the second sample as gaseous $CO_2$ in accordance with the process of the present invention. The addition of $Ca(OH)_2$ to the second sample after the delay for $CO_2$ degassing causes the $HCO_3^-$ concentration to drop while accelerating calcite precipitation as shown in FIG. 4. Approximately 0.17 grams of $Ca(OH)_2$ are required to remove the $HCO_3^-$ from the second sample while about 0.68 grams of calcite are simultaneously produced. There is a substantial reduction in the amount of $Ca(OH)_2$ consumed and calcite produced when the addition of $Ca(OH)_2$ is delayed to allow $CO_2$ to degas from the water. Consequently, chemical costs and sludge disposal costs are reduced by practice of the present process. The utilization of thermal energy added to the water is also maximized by the present process.

While the foregoing preferred embodiment of the invention has been described and shown, it is understood that all alternatives and modifications, such as those suggested and others, may be made thereto and fall within the scope of the invention. For example, the invention has been described above as a continuous water treatment process, but it is apparent to the skilled artisan that the present teaching can readily be adapted to a batch water treatment process within the scope of the present invention.

I claim:

1. A process for reducing the hardness of an oilfield produced water comprising:

a thermal reaction stage, wherein a water which is substantially in a liquid phase and contains scale-forming ions is thermally reacted at a thermal reaction temperature between about 80° and about 140° for a residence time between about 10 and about 20 minutes sufficient to form a first portion of a scale wherein no chemical reactive additives are added to the thermal reaction stage which would elevate the pH of the water, and dissolved gas, if present, is discharged from said water during said thermal reaction stage;

a chemical reaction stage, wherein a hydroxide ion donor is added to said heated water after said thermal reaction stage and reacted with said scale-forming ions to form a second portion of said scale and removing said first and second portions of scale from said water.

2. The process of claim 1 wherein said scale-forming ions are alkaline earth metal cations.

3. The process of claim 1 wherein said hydroxide ion donor is selected from the group consisting of lime, caustic and mixtures thereof.

4. The process of claim 1 further comprising adding a bicarbonate ion donor to said heated water in said chemical reaction stage and chemically reacting said bicarbonate ion donor with said water to form said scale.

5. The process of claim 4 wherein said bicarbonate ion donor is soda ash.

6. The process of claim 1 wherein said dissolved gas is carbon dioxide or hydrogen sulfide.

* * * * *